US012602692B2

(12) United States Patent
Swami

(10) Patent No.: US 12,602,692 B2
(45) Date of Patent: Apr. 14, 2026

(54) SYSTEMS AND METHODS FOR DECREASING COUNTERPARTY SETTLEMENT RISK

(71) Applicant: MARA Holdings, Inc., Las Vegas, NV (US)

(72) Inventor: Ashu Swami, Las Vegas, NV (US)

(73) Assignee: MARA Holdings, Inc., Las Vegas, NV (US)

( * ) Notice: Subject to any disclaimer, the term of this patent is extended or adjusted under 35 U.S.C. 154(b) by 72 days.

(21) Appl. No.: 18/515,776

(22) Filed: Nov. 21, 2023

(65) Prior Publication Data

US 2024/0086929 A1    Mar. 14, 2024

Related U.S. Application Data

(63) Continuation-in-part of application No. 17/751,370, filed on May 23, 2022.

(51) Int. Cl.
*G06Q 20/40* (2012.01)
*G06Q 20/06* (2012.01)
(Continued)

(52) U.S. Cl.
CPC ....... *G06Q 20/4016* (2013.01); *G06Q 20/065* (2013.01); *G06Q 20/3827* (2013.01)

(58) Field of Classification Search
CPC ............. G06Q 20/4016; G06Q 20/065; G06Q 20/3827; G06Q 40/04; G06Q 2220/00; H04L 9/50; H04L 2209/56
(Continued)

(56) References Cited

U.S. PATENT DOCUMENTS

| | | | |
|---|---|---|---|
| 7,746,343 | B1 | 6/2010 | Charaniya |
| 10,311,515 | B2 | 6/2019 | Katsuyama |

(Continued)

OTHER PUBLICATIONS

Sun W, Jin H, Jin F, Kong L, Peng Y, Dai Z. Spatial analysis of global Bitcoin mining. Sci Rep. Jun. 23, 2022;12(1):10694. doi: 10.1038/s41598-022-14987-0. PMID: 35739226; PMCID: PMC9226069. (Year: 2022).*

(Continued)

*Primary Examiner* — Bennett M Sigmond
*Assistant Examiner* — George N. Proios
(74) *Attorney, Agent, or Firm* — FISH IP LAW, LLP

(57) ABSTRACT

Apparatus, systems and methods improve efficiency in transacting a swap or other futures based financial instrument, by using time-weighted index averages to decrease counterparty settlement risk. In preferred embodiments related to Bitcoin and several other cryptocurrencies, the swaps are based upon a time-weighted index average ($D_{wa}$) of multiple instances of difficulty ($D_x$ to $D_y$) of mining the cryptocurrency over multiple time periods ($P_x$ to $P_y$) where both Ds and Ps are available from the decentralized public blockchain. Traders can use these time-weighted index averages in conjunction with the anticipated values of Ds and Ps for the remainder of the duration of the index, to calculate the index value at any given time. The index can be used to increase or decrease mining of digital assets, or switch allocation of resources between mining different digital assets.

20 Claims, 10 Drawing Sheets

(51) Int. Cl.
  *G06Q 20/38* (2012.01)
  *G06Q 40/04* (2012.01)

(58) Field of Classification Search
  USPC .......................................................... 705/37
  See application file for complete search history.

(56) References Cited

U.S. PATENT DOCUMENTS

| | | | |
|---|---|---|---|
| 10,546,277 | B2 | 1/2020 | Metnick |
| 10,748,210 | B2 | 8/2020 | Bonig |
| 10,949,922 | B2* | 3/2021 | Pierce et al. ........... G06Q 40/04 |
| 2013/0024340 | A1 | 1/2013 | Co |
| 2016/0330031 | A1 | 11/2016 | Drego |
| 2017/0046689 | A1 | 2/2017 | Lohe |
| 2017/0085545 | A1 | 3/2017 | Lohe |
| 2017/0103458 | A1* | 4/2017 | Pierce et al. ........... G06Q 40/04 |
| 2017/0187535 | A1 | 6/2017 | Middleton |
| 2017/0243289 | A1 | 8/2017 | Rufo |
| 2017/0372278 | A1 | 12/2017 | Frolov |
| 2018/0005318 | A1* | 1/2018 | Pierce et al. ........... G06Q 40/04 |
| 2019/0080411 | A1* | 3/2019 | Pierce et al. ........... G06Q 40/04 |
| 2021/0174442 | A1* | 6/2021 | Trudeau et al. ....... G06Q 20/02 |

OTHER PUBLICATIONS

International Search Report and Written Opinion of the International Search Authority, PCT application PCT/US23/23192, dated Aug. 29, 2023.

* cited by examiner

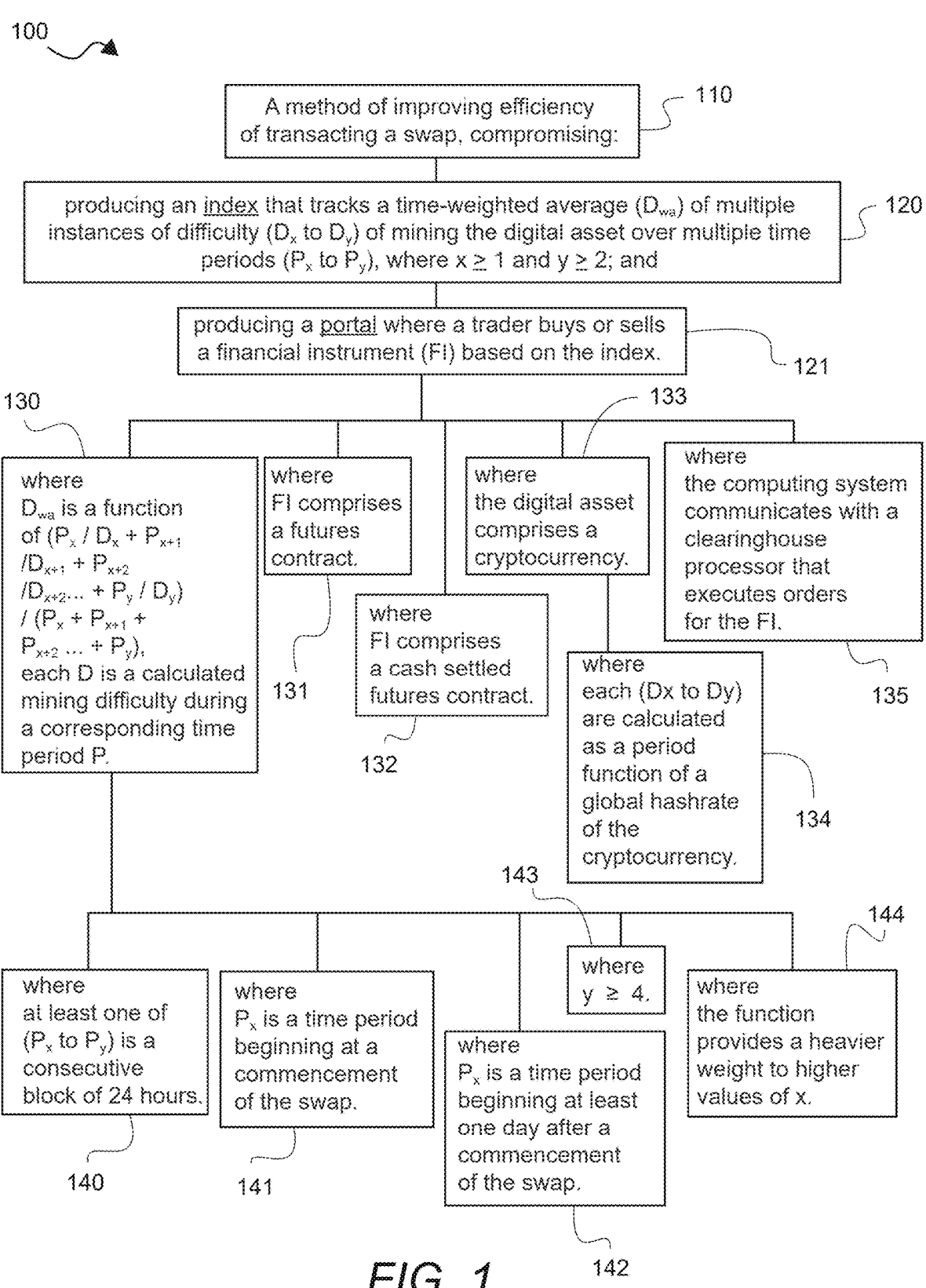

100

110 — A method of improving efficiency of transacting a swap, compromising:

120 — producing an index that tracks a time-weighted average ($D_{wa}$) of multiple instances of difficulty ($D_x$ to $D_y$) of mining the digital asset over multiple time periods ($P_x$ to $P_y$), where $x \geq 1$ and $y \geq 2$; and 121 — producing a portal where a trader buys or sells a financial instrument (FI) based on the index.

130 — where $D_{wa}$ is a function of ($P_x / D_x + P_{x+1} /D_{x+1} + P_{x+2} /D_{x+2} \ldots + P_y / D_y$) / ($P_x + P_{x+1} + P_{x+2} \ldots + P_y$), each D is a calculated mining difficulty during a corresponding time period P.

131 — where FI comprises a futures contract.

132 — where FI comprises a cash settled futures contract.

133 — where the digital asset comprises a cryptocurrency.

134 — where each (Dx to Dy) are calculated as a period function of a global hashrate of the cryptocurrency.

135 — where the computing system communicates with a clearinghouse processor that executes orders for the FI.

140 — where at least one of ($P_x$ to $P_y$) is a consecutive block of 24 hours.

141 — where $P_x$ is a time period beginning at a commencement of the swap.

142 — where $P_x$ is a time period beginning at least one day after a commencement of the swap.

143 — where $y \geq 4$.

144 — where the function provides a heavier weight to higher values of x.

310 — Ds, Ps Storage

320 — Index Calculation Engine

330 — Swap Trading Marketplace

340 — Account / Position Management System orders

350 — Calculates mark-to-market position values, settlement amount to margin calls

SYSTEMS AND METHODS FOR DECREASING COUNTERPARTY SETTLEMENT RISK

This application is a continuation in part of and claims the benefit of priority to U.S. patent application Ser. No. 17/751,370, filed May 23, 2022, which is incorporated by reference in its entirety herein.

FIELD OF THE INVENTION

The field of the invention is computing systems for handling financial transactions.

BACKGROUND

This background description includes information that may be useful in understanding the present invention. It is not an admission that any of the information provided herein is prior art or relevant to the presently claimed invention, or that any publication specifically or implicitly referenced is prior art.

Indices and Swaps

An index is a measure of anything. Indices have a pre-defined formula so that anyone can calculate and verify it independently at any time. Indices usually track a metric that is meaningful economically but is not readily available without doing a bunch of calculations. e.g. S&P 500 tracks average prices of large cap stocks which conveys the health of economy and VIX tracks the volatility of stocks which conveys perceived risk in the economy.

Exchange traded financial instruments such as swaps are used by commodity producers and speculators to hedge and speculate on the variable economics of commodity prices. Swaps have been in existence for nearly 140 years. Each swap is anchored to an index.

A swap is a trade between two parties (called counterparties), a buyer and a seller, where the buyer is betting that an index will increase and the seller is betting that it will decrease. Therefore, they enter a swap, a contractual agreement through which they agree to exchange payments based on an index over a fixed period of time.

At the heart of a swap is an exchange of variable or risky cash flow (that tracks the index) for a fixed predictable cash flow. The receiver of the fixed cash flow is called the seller of the swap.

The exchange of cash is called settlement. Settlements can happen at regular intervals during the lifetime (duration) of the swap. Settlement value is the difference between the current value of the index to the value of the index at previous settlement. Therefore, the sum of all settlements is equal to difference between the final index price and the initial index price. The former represents the variable cash flow and the latter represents the fixed cash flow.

Settlement frequency is typically anywhere from 1 day to 1 year and duration is typically anywhere from 1 month to few years.

Settlement is based on some index, the value of which is publicly available and an least in theory cannot be manipulated e.g. LIBOR, or crude oil index, or global commodity prices etc. As a result, the price of the swap (the price at which the Seller will sell the swap to the buyer on day1) will be equal to the anticipated value of the index at the expiration of the swap.

If an index has a beginning value of 4.5 and the end of day prices are as follows, then the daily buyer to seller or seller to buyer payouts will be as follows:

| Day | Index End Of Day Price (Mark) | Net Settlement |
|---|---|---|
| 1 | 4.8 | $0.3 seller to buyer |
| 2 | 4.7 | $0.1 buyer to seller |
| 3 | 4.5 | $0.2 buyer to seller |
| . . . | . . . | . . . |
| 29 | 4.2 | . . . |
| 30 | 4.6 | $0.4 seller to buyer |

Daily variable payment from seller to buyer=Index value on a given day–Index value on previous day. The end of day value is also called 'mark' and this type of settlement as 'mark-to-market' settlement.

Daily settlement reduces default risk: The Index values will change every day from the Day1 value and the buyer and seller will exchange cash daily to reflect that change. As a result, although the Day30 value may be significantly different from Day1 value, the cash exchange on Day30 only reflects the change from Day29.

In an illustrative example, a broker launches a-3 yr interest rate swap that exchanges Prime+1% for a Fixed rate of 2%, with weekly settlement. This swap allows the seller to swap a variable interest rate for a fixed rate. If Trader A sells $10,000 worth of these swaps to Trader B, then every week for the next three years, A will owe to B, $10,000* (whatever the current Prime rate is +1%)/52, and B will owe to A, $10,000*2%/52=$3.8462. The settlement will be a 'net settlement' which means if A's amount owed to B is greater than what B owes to A, then A will just pay the difference; and vice versa. In such swaps the notional is not exchanged between the counterparties. The notional is only used to determine the multiplier for the cash flows.

Swaps and Digital Assets

It is possible to extend swaps to indices that track aspects of digital assets, including for example, difficulty in mining Bitcoin or other cryptocurrency.

In the example above, the swap was based on the current (spot) prime rate, therefore, it tracks the prime rate index. Abandoned US patent application number 2017/0103458 to Pierce (the '358 application) describes a similar invention-a swap or a future based on an index that tracks the spot 'difficulty' of mining cryptocurrencies. The '358 application is incorporated by reference herein in its entirety. Where a definition or usage of a term in the '358 application is inconsistent or contrary to how that term is used herein, the usage of that term herein applies to interpretation of teachings herein, and the definition or usage of that term in the reference does not apply.

The solution taught in the '358 application does not, however, solve several complexities idiosyncratic to crypto, and especially Bitcoin mining. As described below, the math of the solution disclosed in the '358 application has large gaps that would lead to large tracking errors.

Bitcoin mining is a 'congestion game'. Miners deploy computing resources to solve a cryptographic puzzle and the first miner to solve the puzzle wins the reward (block reward). As a result, the probability of a miner winning the reward E is equal to the percentage of their compute relative to the compute deployed by all miners engaged in solving this puzzle a.k.a.

Global hashrate=G

Miner's hashrate=M

Rate at which block are being generated=R

Probability of the miner winning a reward, Prob=M/G

Probability of a unit hashrate winning a reward, Prob∝1/G, where ∝ represents proportionality The total expected reward earned by a unit hashrate in a given time, $E \propto R/G$ The reward E is embedded in the new block that is added to the chain, therefore, R also represents the rate of growth of the chain. The Bitcoin software automatically adjusts the difficulty of the puzzle such that R=6 blocks/hour a.k.a. the combined compute resources of all the miners can solve the puzzle and add a new block on the chain on average in 10 minutes. If the puzzle is being solved in less than 10 minutes, then the Bitcoin software will make the puzzle more difficult and if the puzzle is being solved in more than 10 minutes then the difficulty will be reduced.

The software makes this adjustment periodically but since there is no concept of universal time in most early chains such as Bitcoin, the block height a.k.a. the length of the chain serves as a proxy for time. The software, therefore, makes the adjustment after every 2016 blocks. That has an unintended consequence—there is no assurance how much real time will elapse before 2016 blocks are added e.g. if G declines by 50% it could be a full month before the difficulty is adjusted, or if G increases by 100% the difficulty will get adjusted within a week. As we will demonstrate below, it is critical to track the time elapsed between difficulty changes for a perfect hedging instrument. Prior inventions have completely ignored this aspect.

Global hashrate prior to difficulty adjustment=$G_{prev}$

Difficulty after adjustment=D $D \propto G_{prev}$ $R \propto G/D$ $E \propto R/(G \times D) \Rightarrow E \propto 1/D$ As shown above, E does not depend on current G; it only depends $G_{prev}$ a.k.a. D. One way to resolve this problem is to use an index that tracks D, and a future that settles on the final value of D. The '358 application teaches that solution, which unfortunately leads to several problems.

First, the solution taught by '358 application produces an average tracking error of ~5%, in addition to high rebalancing cost.

Second, since a miner's reward E is proportional to inverse of D, buying an instrument that settles to D will require constant rebalancing for the hedge to be maintained as D changes. e.g. a 30% increase in D corresponds to 23% (i.e. 1-1/1.3) decline in mining revenue whereas a 30% decrease in D will correspond to 43% increase in mining revenue.

Thus, there is still a need for systems and methods that improve efficiency in transacting swaps or other futures based financial instruments, by decreasing counterparty settlement risk.

SUMMARY OF THE INVENTION

The subject matter disclosed and claimed herein provides apparatus, systems and methods that improve efficiency in transacting a swap or other futures based financial instrument, by using time-weighted index averages to decrease counterparty settlement risk. A significant benefit is that implementation of the claimed subject matter can produce a tracking error of <0.1%, with no rebalance required from start to expiration.

In preferred embodiments related to Bitcoin, several other cryptocurrencies, and potentially other digital assets, the swaps are based upon a time-weighted index average ($D_{wa}$) of multiple instances of difficulty ($D_x$ to $D_y$) of mining the asset over multiple time periods ($P_x$ to $P_y$). Traders can use these time-weighted index averages in conjunction with the anticipated values of Ds and Ps for the remainder of the duration of the index, to calculate the index value at any given time.

The multiple time periods ($P_x$ to $P_y$) can have any suitable lengths from days to weeks to months, can be the same or different, and can be static or variable. The first time period $P_x$ preferably begins at commencement of a term of the swap, but can commence later during the term. Weighting can be equally proportional through the term, or in some other manner, as for example weighting more heavily towards the end of the term.

More generally, using time-weighted index averages to decrease counterparty settlement risk is contemplated where the index is based upon one or more values other than mining difficulties. For example, an index can be based upon a time-varying value of an equity or a collection of equities, or a bond or collection of bonds.

Systems, methods, and devices for improving efficiency of digital assets, for example mining, collecting, or transacting digital assets, are contemplated. An index tracking a time-weighted average ($D_{wa}$) of multiple instances of difficulty ($D_x$ to $D_y$) of mining a first digital asset (or second, third, or up to dozens of digital assets) over multiple time periods ($P_x$ to $P_y$) is produced, where x is at least 1 and y is at least 2. The difficulty of mining the first digital asset (or any or all digital assets) is proportional to a global hashrate of the first digital asset, particularly for cryptocurrency. A miner of the first digital asset accesses the index and manages a hardware resource configured to mine digital assets (e.g., first, second, third, etc. digital assets, any or all digital assets). The miner changes (e.g., reduces, increases, pauses, stops, resumes, switches, etc.) an allocation of the hardware resource mining the first digital asset (or any digital asset) based at least in part on the index.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 is a flowchart of steps in preferred embodiments according to the inventive subject matter, including various alternatives.

DETAILED DESCRIPTION

Figure 2:
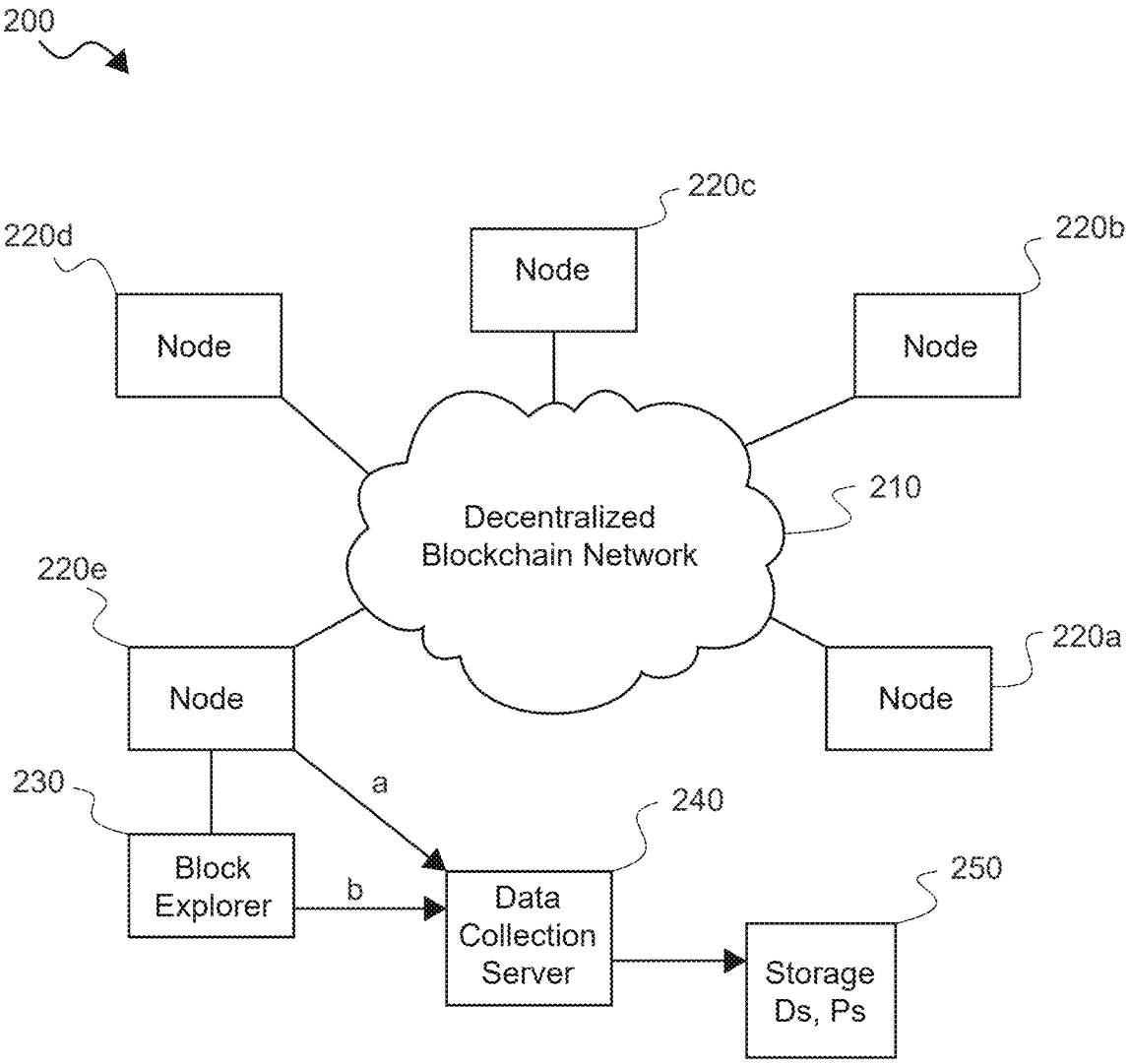
FIG. 2 is a schematic depicting nodes interacting with a block explorer to collect and store difficulty and time period data.

Improvements in transacting a swap or other futures based financial instrument are accomplished using time-weighted index averages to decrease counterparty settlement risk.

Example—Index Calculation and Periodic Settlement

Assume that an index tracks the next 7 weeks of anticipated earnings, and the average value of the index is calculated as $(P_1/D_1+P_2/D_2 \ldots +P_n/D_n)/(P_1+P_2 \ldots +P_n)$.

In Week-1, all future daily values of Ds and Ps are anticipated. E=anticipated Bitcoin to be mined by 1EH in 7 weeks=Index value=98.1. A seller of this swap will receive 98.1 from the buyer (either all upfront or in equal installments). The buyer will receive whatever is the final value of the Index.

In Week-2, $P_1/D_1$ ends up being lower than anticipated, 96 vs 97. As a result, not only did 1EH produce less Bitcoin than anticipated, but the future expectation of production has been lowered by the market (100 vs 101, in Week-7). Therefore, the new index stands at 97.8. Net settlement will be from buyer to seller for current index value-previous index value=0.3

Corresponding calculations occur for Week-3 through Week-6.

In Week-7, all the values are actuals $D_1$ to $D_n$ and $P_1$ to $P_n$, and the index stands at 97. Previous value of index was 97.1, therefore, the last settlement will be from the buyer to the seller for 0.1. The index changed from 98.1 at the start to 97 at expiration. The seller received a fixed 98.1 and the buyer the final 97, which was also the realized value of E with <0.1% error.

As seen above, the index closely tracks the actual mining output of a unit hashrate over a given period, either anticipated or realized. Therefore, bitcoin miners selling this swap are long sellers because they hold an asset (hashrate) which generates a cash flow that is exactly the same as the index.

The seller in a trade can either be a short seller or a long seller. Both are betting on the value of traded instrument to decline but the short seller is doing it for pure speculation whereas the long seller is usually doing it as a hedge. A 'long seller' holds an asset that has the same payout as the index. They sell the index (swap) to hedge the volatility of returns of that asset. Therefore, their net payout is always close to 0. A 'short seller' on the other hand earns a net profit when the Index declines and pays from their pocket when the Index rises.

For cryptocurrency miners, the systems and methods disclosed herein reduce the risk of future deployments because they can use the index to gain insight into how congested the game is going to be. Also, if the miner has machines that generate the hashrate that he is selling, he may not need to post cash margin, as his machines can be the collateral.

In this Example the first time period $P_1$ starts at the beginning of the term of the contract. However, it is contemplated that the first time period $P_1$ for this exemplary contract, or for a different financial instrument, could start later in the term. It is also contemplated that instead of a week long time period, time periods P used in the time-averaging calculations could be some other length, likely at least a consecutive block of 24 hours, and including bi-weekly, monthly, bi-monthly, quarterly, etc.

It is still further contemplated that the time-averaging calculations could give greater weight to different periods during the term. For example, a different one might use a function that provides a heavier weight to later periods.

It is still further contemplated that settlements can be made in any suitable manner, including for example settlement by cash or cash-equivalents, and settlement by other cryptocurrencies or other digital assets.

It is still further contemplated that a computing system will handle calculation and storage of the difficulty D, period length P and index averaging calculations. The same computing system, or a clearinghouse processor in communication with the computing system, can execute orders for the financial instrument.

Futures Contracts in General

The concepts discussed above in the Example can be applied to futures contracts in general, including indices based upon values V of one or more equities, and/or one or more bonds. In such cases, the following more generic formula can apply:

$$V_{wa}=f((P_x/V_x+P_{x+1}/V_{x+1}+P_{x+2}/V_{x+2} \ldots +P_y/V_y)/(P_x+P_{x+1}+P_{x+2} \ldots +P_y)).$$

Embodiments of the inventive subject matter described in the preceding paragraphs are exemplified if the following figures.

In FIG. 1, schematic 100 depicts a method 110 of improving efficiency of transacting a swap, comprising two basic steps:

Step 120—producing an index that tracks a time-weighted average $(D_{wa})$ of multiple instances of difficulty $(D_x$ to $D_y)$ of mining the digital asset over multiple time periods $(P_x$ to $P_y)$, where x≥1 and y≥2; and Step 121—providing a portal where a trader buys or sells a financial instrument (FI) based on the index.

$D_{wa}$ can be calculated in any suitable manner, one possibility of which is shown in Box 130, where $D_{wa}$ is a function of $(P_x/D_x+P_{x+1}/D_{x+1}+P_{x+2}/D_{x+2} \ldots +P_y/D_y)/(P_x+P_{x+1}+P_{x+2} \ldots +P_y)$, and each D is a calculated mining difficulty during a corresponding time period P. Some of the contemplated options for such calculation are described below:

Box 140—where at least one of $(P_x$ to $P_y)$ is a consecutive block of 24 hours;

Box 141—where $P_x$ is a time period beginning at a commencement of the swap;

Box 142—where $P_x$ is a time period beginning at least one day after a commencement of the swap;

Box 143—where y≥4; and

Box 144—where the function provides a heavier weight to higher values of x.

Some contemplated options are described below:

Box 131—where financial instrument FI comprises a futures contract;

Box 132—where FI comprises a cash settled futures contract;

Box 133—where the digital asset comprises a cryptocurrency

Box 133—where each $(D_x$ to $D_y)$ are calculated as a period function of a global hashrate of the cryptocurrency; and Box 134—the computing system communicates with a clearinghouse processor that executes orders for the FI.

In FIG. 2, system 200 depicts nodes 220a-220e are nodes of a Decentralized Blockchain Network 210 that service a Bitcoin, cryptocurrency, or other digital asset blockchain. Difficulty and time period information is extracted from the blockchain, and sent to Data Collection Server 240, by one or more of any one of more of the Nodes, including e.g. Node 220e and pathway a in this example, and Block Explorer 230 and pathway b. Difficulty and time period information is then stored in Storage Ds, Ps 250.

Figure 3:
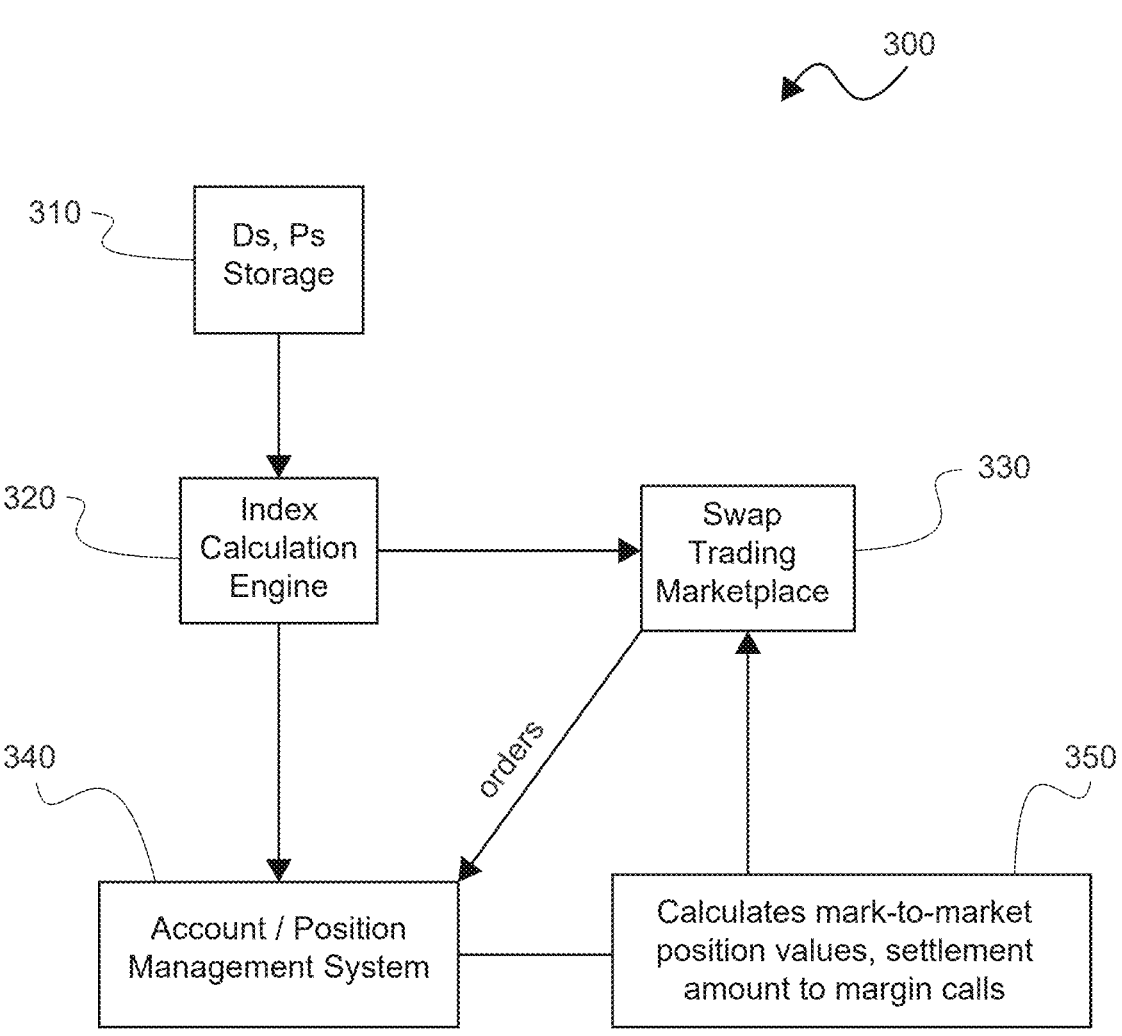
FIG. 3 is a schematic depicting flow of information using of difficulty and time period data to facilitate swap trading.
Figure 4:
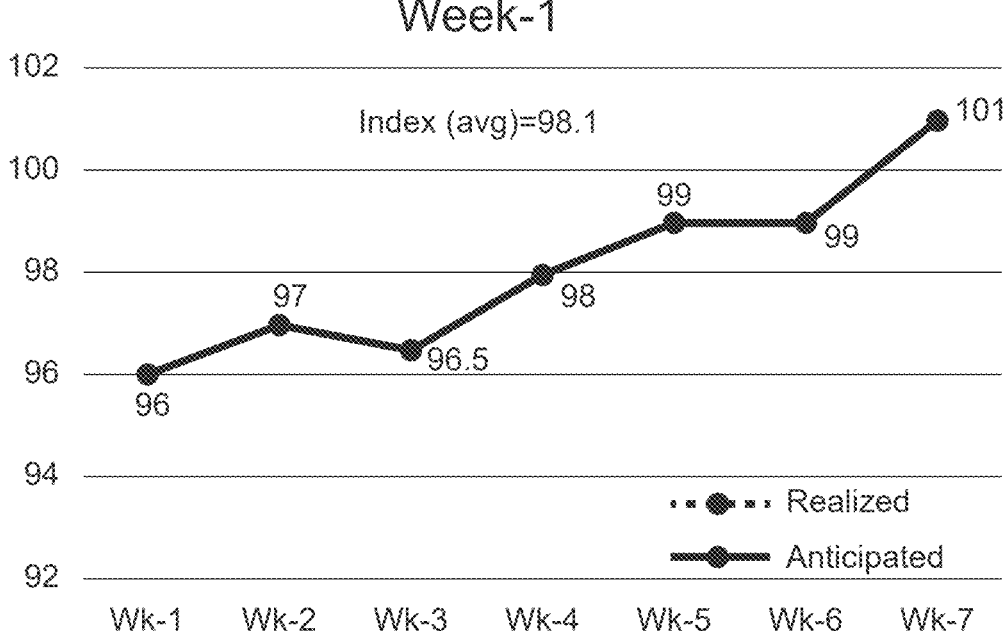
FIG. 4 shows the average value of the calculated index in week-1 in an example of index calculation and periodic settlement.
Figure 5:
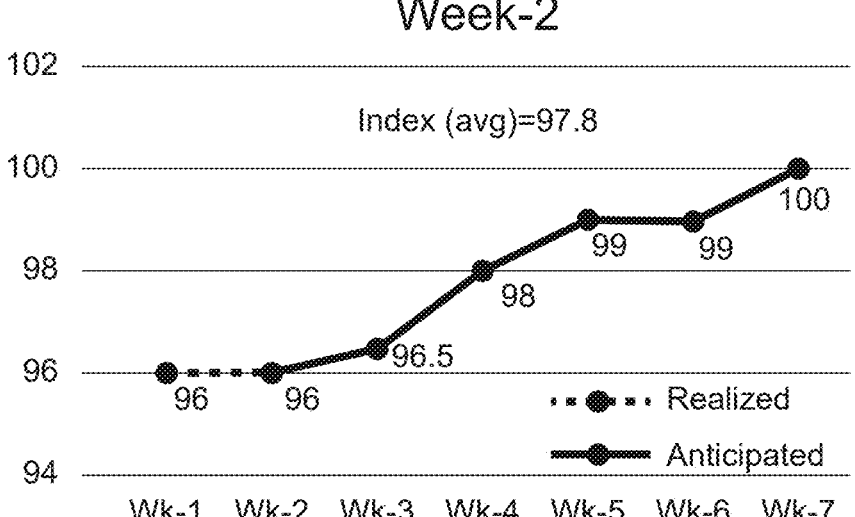
FIG. 5 shows the average value of the calculated index in week-2 in an example of index calculation and periodic settlement.
Figure 6:
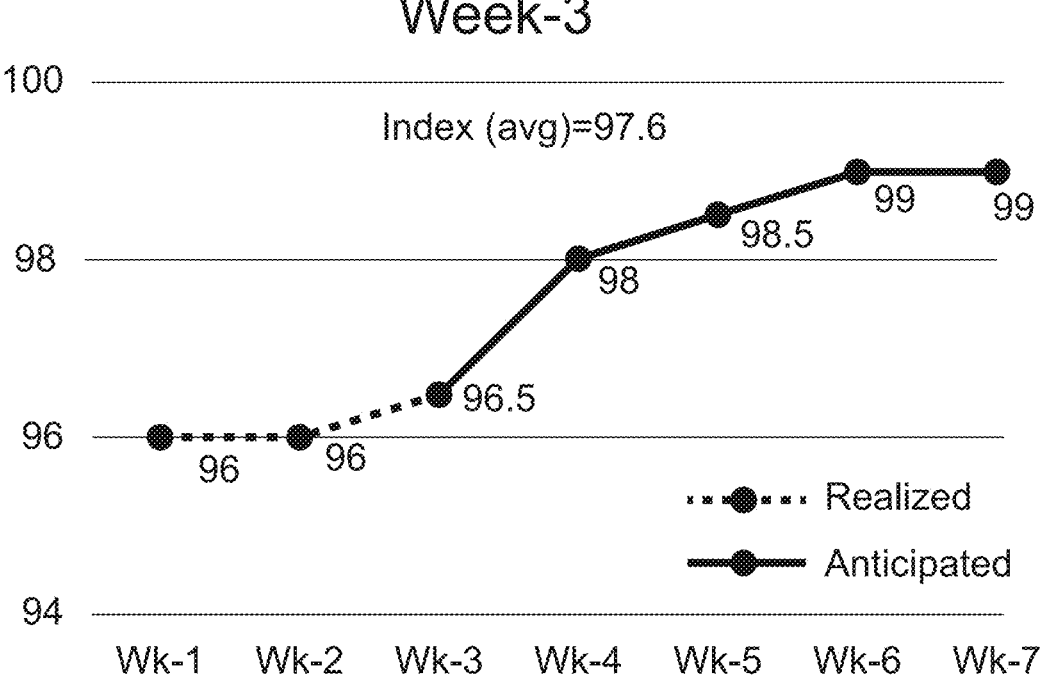
FIG. 6 shows the average value of the calculated index in week-3 in an example of index calculation and periodic settlement.
Figure 7:
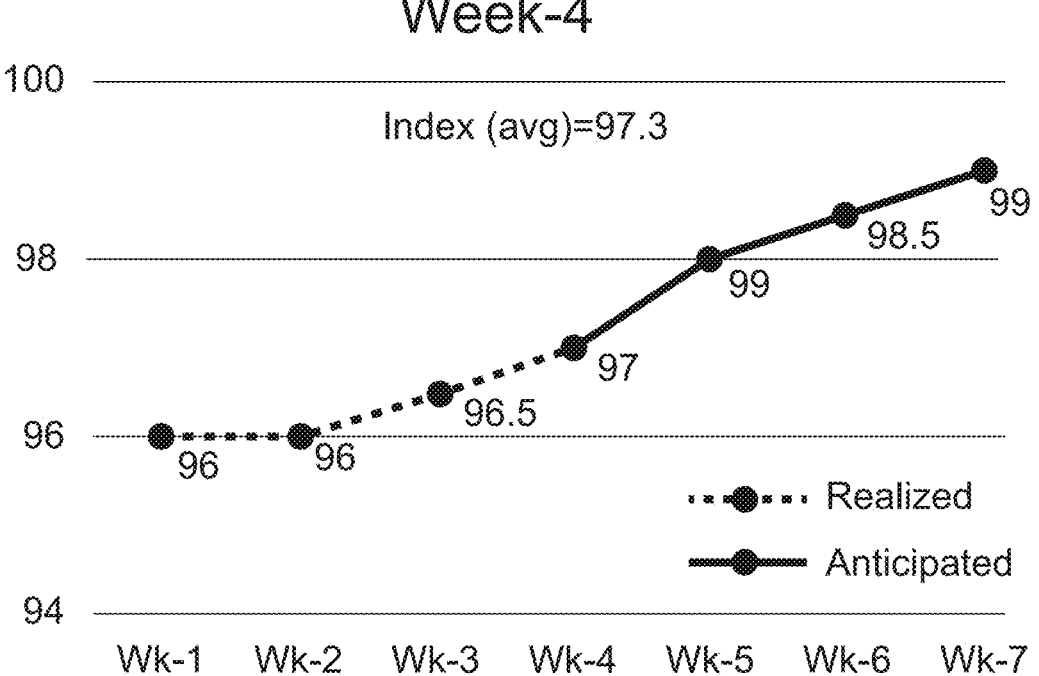
FIG. 7 shows the average value of the calculated index in week-4 in an example of index calculation and periodic settlement.
Figure 8:
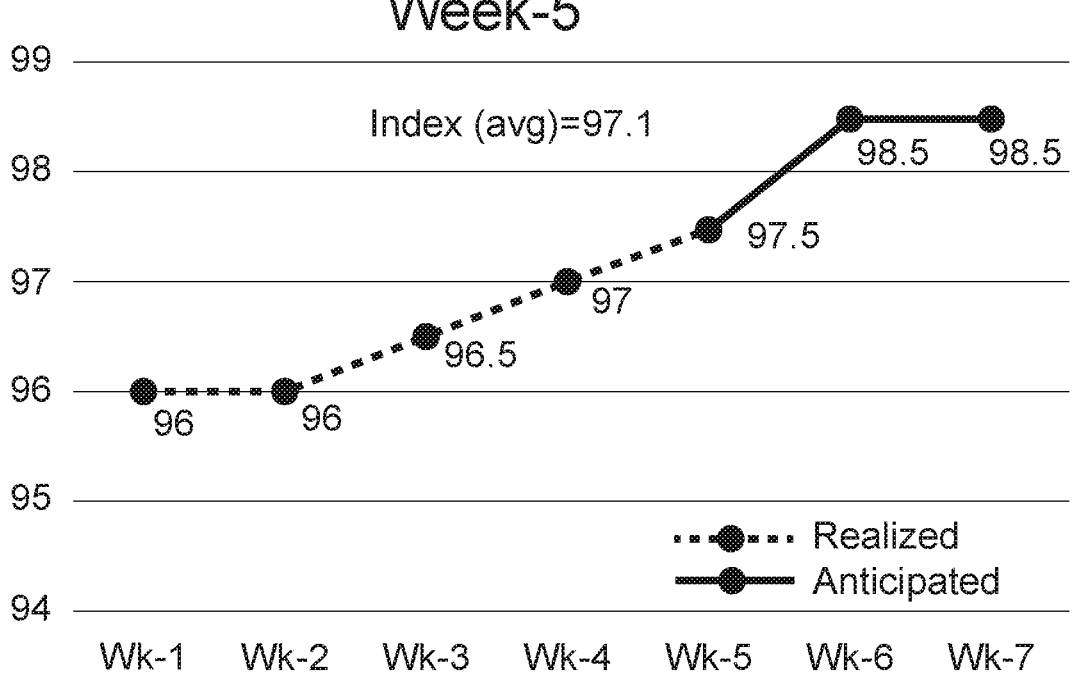
FIG. 8 shows the average value of the calculated index in week-5 in an example of index calculation and periodic settlement.
Figure 9:
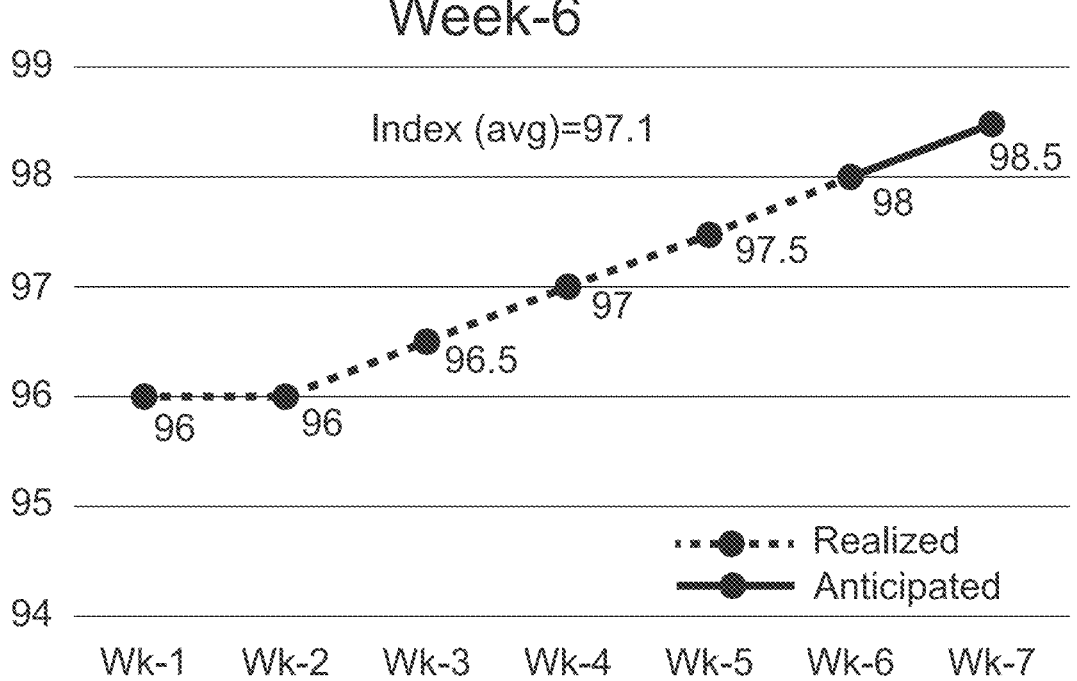
FIG. 9 shows the average value of the calculated index in week-6 in an example of index calculation and periodic settlement.
Figure 10:
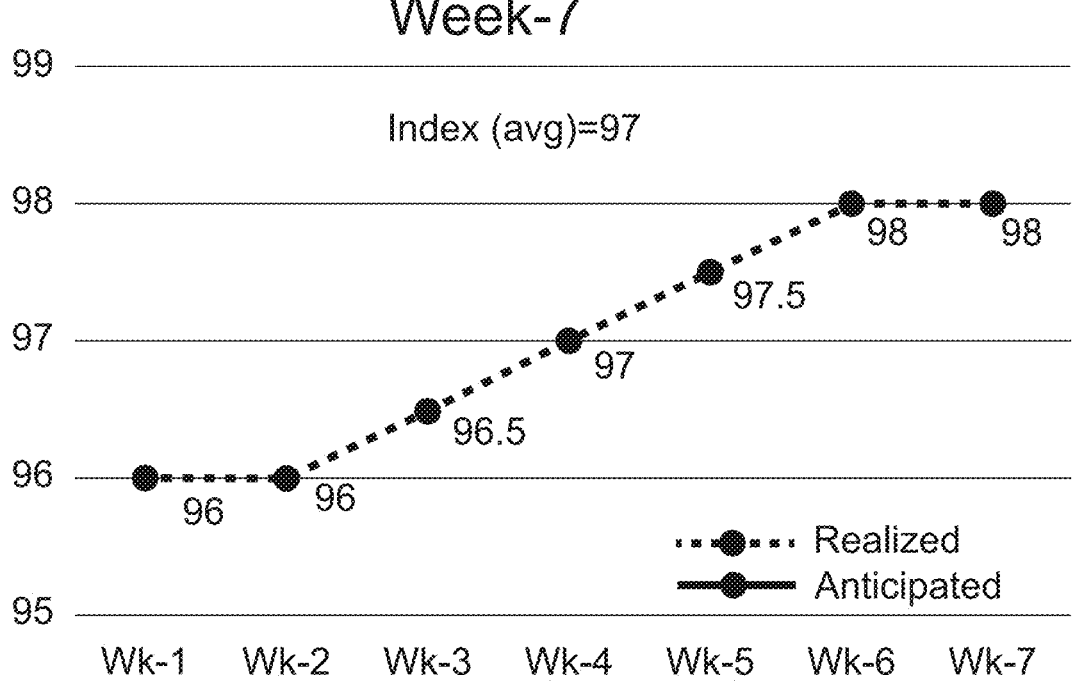
FIG. 10 shows the average value of the calculated index in week-7 in an example of index calculation and periodic settlement.

In FIG. 3, schematic 300 depicts depicting flow of information using of difficulty and time period data to facilitate swap trading. Difficulty and time period data (discussed above) is stored in Ds, Ps Storage 310 (250 in FIG. 2) is provided to Index Calculation Engine 320, which provides index information to Swap Trading Marketplace 330 and Account/Position Management System 340. Swap orders flow from Swap Trading Marketplace 330 to Account/Position Management System 340, which then calculates mark-to-market position values, settlement amount and margin calls 350. The mark-to-market position values, settlement amount and margin calls information 350 is then passed back to the Swap Trading Marketplace 330.

Systems, methods, and devices for improving efficiency of digital assets, for example mining, collecting, or transacting digital assets, are further contemplated. An index tracking a time-weighted average ($D_{wa}$) of multiple instances of difficulty ($D_x$ to $D_y$) of mining one type of digital asset (or second, third, or up to dozens of digital assets) over multiple time periods ($P_x$ to $P_y$) is produced, where x is at least 1 and y is at least 2. The difficulty of mining the digital asset (or any or all digital assets) is proportional to a global hashrate of the first digital asset, particularly for cryptocurrency.

A miner of the digital asset manages a hardware resource configured to mine digital assets (e.g., first, second, third, etc. digital assets, any or all digital assets) and accesses the index. The miner changes (e.g., reduces, increases, pauses, stops, resumes, switches, etc.) an allocation of the hardware resource mining the digital asset (or any digital asset) based at least in part on the index. Such changes can be physical (e.g., changing, adding, improving, reducing, removing hardware components, turning off or disconnecting hardware components, relocating hardware components based on local factors like energy demand, costs, regulations, environmental impact, etc.) or functional (e.g., reassigning hardware to mine one or more digital assets, performance enhancing software modifications of hardware components, etc.).

For example, a miner reduces, pauses, or stops mining digital asset when the index increases (e.g., more than 10% increase, 20%, 30%, 40%, 50%, 100%, 200%, or greater increase over a trailing average of 30 days, 15 days, 10 days, 5 days, 3 days, 2 days, 24 hours, 12 hours, or less, or other suitable historic performance indicator). A miner may likewise increase or resume mining the digital asset when the index decreases (e.g., more than 10% decrease, 20%, 30%, 40%, 50%, 100%, 200%, or greater decrease from a trailing average over 30 days, 15 days, 10 days, 5 days, 3 days, 2 days, 24 hours, 12 hours, or less, or other suitable historic performance indicator). Alternatively, the miner can switch from mining one digital asset to mining another digital asset as the difficulty index of the first digital asset changes, a difficulty index of the second digital asset changes, or can balance allocation of hardware resources between mining the first and the second (or more) digital assets based on comparing the difficulty index for each (or all) digital asset.

An operating cost (e.g., maintenance cost, energy cost, leased space, environmental control, security, etc.) of the hardware resource over multiple time periods ($P_x$ to $P_y$) is further determined. The miner also changes allocation of resources mining the digital asset (or any digital asset) based on changes in difficulty of mining, likelihood of earning or gaining the digital asset, market value of the digital asset, and cost to mine digital asset, as well as additional variables affecting the cost/benefit analysis of allocating compute resources to mine a digital asset. In some embodiments, changes in operational costs internal to the hardware resources (e.g., maintenance, upkeep, upgrade, replacement, etc.) and external to the hardware resources (e.g., regulations, fines, fees, or taxes, electricity cost and supply capacity, environmental impact, changes to digital assets, etc.) are monitored and indexed. Such operational cost indices can be used with mining difficulty indices to reallocate or balance assignment of hardware resources mining one or more digital assets on a continuous, intermittent, or otherwise recurring basis.

For example, the miner may reduce allocation of the hardware resource mining the digital asset, conduct physical maintenance of the hardware resource, reduce energy consumption of the hardware resource, or upgrade a performance improving component of the hardware resource, when the index increases or the operating cost increases. Likewise, the miner may allocate further hardware resources to mine the digital asset, or deploy, install, or implement a new hardware resource to mine the digital asset when the index decreases or the operating cost decreases. Alternatively, or in combination, the miner may switch the hardware resource from mining one digital asset to mining a second digital asset when the index for the first digital asset increases, a difficulty for the second digital asset decreases, or a comparison of difficulty indices for two or more digital assets indicates greater comparative value in mining one digital asset over another. A value of a digital asset can be assessed or determined by appropriate methods (e.g., based on spot price, futures market, option market, independent valuation, market analysis, etc.), and the miner stops the hardware resource from mining of the first digital asset when either the index or the operating cost outweighs the value of the digital asset.

A portal can further be provided to trade a financial instrument based at least in part on the index of the digital asset. Financial instruments include futures contracts, cash settled futures contracts, or other suitable instruments. The miner can further use such a portal to apply a component of the hardware resource mining the digital asset as collateral supporting the financial instrument.

The digital asset can be a cryptocurrency, where mining difficulty is typically dependent on global hashrate. For cryptocurrency based digital assets, multiple instances of difficulty ($D_x$ to $D_y$) are preferably calculated as a period function of the global hashrate of the cryptocurrency. The time-weighted average of difficulty $D_{wa}$ can also be a function of $(P_x/D_x+P_{x+1}/D_{x+1}+P_{x+2}/D_{x+2} \ldots +P_y/D_y)/(P_x+P_{x+1}+P_{x+2} \ldots +P_y)$, wherein each D (where D is proportional to global hashrate) is a calculated mining difficulty during a corresponding time period P. At least one of the time periods ($P_x$ to $P_y$) can be a consecutive block of 2 hours, 6 hours, 12 hours, 28 hours, 24 hours, 36 hours, 48 hours, or greater, as mining and trading of digital assets are typically occur on a 24 hr continuous cycle. In some embodiments, the function provides a heavier weight to higher values of x.

Some benefits of the inventive subject matter include using a difficulty index to reduce electricity usage if the mining efficiency is objectively low, the cost (e.g., financial, environmental, social, political, regulatory, etc.) is objectively high, or if a comparison of mining efficiency and cost favors reducing electricity usage. Similarly, such comparisons may promote miner development or investment in new, low cost (e.g., financial, environmental, social, political, etc.) energy sources to sustain digital asset mining operations.

Difficulty indices for digital assets also enable a digital asset miner to lay off the risk (i.e., suspend, delay, hedge, insure, etc.) to their operations of production volatility, for example when caused by fluctuations in mining difficulty. Difficulty indices also allow power generators to redirect excess power to mine digital assets and trade related financial instruments (e.g., sell swaps), rather than shutting down power generation (e.g., winding down or turning off the power plant), when the electrical grid is saturated and cannot otherwise absorb the current power generation output.

Thus it should be appreciated the inventive subject matter provides direct, tangible results including operating efficiency, reduced energy consumption, compliance with digital asset mining regulations, improving hardware performance, mitigating hardware degradation, extending useful life of hardware components, and improving value generation of hardware components engaged in digital asset mining.

As used in the description herein, and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be appreciated that all calculations contemplated herein, including calculations of index and weighted average values, can be performed by generic or special purpose servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of managing energy usage of computers involved in mining digital assets, comprising:

producing an index tracking a time-weighted average ($D_{wa}$) of multiple instances of difficulty ($D_x$ to $D_y$) of mining a first digital asset over multiple time periods ($P_x$ to $P_y$), where x is at least 1 and y is at least 2, and wherein the difficulty of mining the first digital asset is proportional to a global hashrate of the first digital asset; and providing an electronic miner of the first digital asset access to the index, wherein the electronic miner manages a hardware resource configured to mine digital assets;

the electronic miner changing an allocation of the hardware resource mining the first digital asset to reduce energy consumption based at least in part on the index.

2. The method of claim 1, further comprising determining an operating cost of the hardware resource over multiple time periods ($P_x$ to $P_y$).

3. The method of claim 2, wherein the electronic miner reduces allocation of the hardware resource mining the first digital asset when the index increases or the operating cost increases.

4. The method of claim 2, wherein the electronic miner deploys an additional hardware resource when the index decreases or the operating cost decreases.

5. The method of claim 2, wherein the electronic miner conducts physical maintenance of the hardware resource when the index increases or the operating cost increases.

6. The method of claim 2, further comprising determining a value of the first digital asset, wherein the electronic miner stops the hardware resource from mining of the first digital asset when either the index or the operating cost outweigh the value.

7. The method of claim 1, wherein the electronic miner reduces energy consumption of the hardware resource when the index increases or the operating cost increases.

8. The method of claim 1, wherein the electronic miner switches the hardware resource from mining the first digital asset to mining a second digital asset when the index increases.

9. The method of claim 1, further comprising the electronic miner upgrading a performance improving component of the hardware resource when the index increases or the operating cost increases.

10. The method of claim 1, further comprising providing a portal through which a financial instrument is traded based at least in part on the index.

11. The method of claim 10, wherein the financial instrument comprises a futures contract or a cash settled futures contract.

12. The method of claim 10, further comprising applying a component of the hardware resource as collateral to the financial instrument.

13. The method of claim 1, wherein the first digital asset is a cryptocurrency.

14. The method of claim 13, wherein each of the multiple instances of difficulty ($D_x$ to $D_y$) are calculated as a period function of the global hashrate of the cryptocurrency.

15. The method of claim 1, wherein the time-weighted average of difficulty $D_{wa}$ is a function of $(P_x/D_x+P_{x+1}/D_{x+1}+P_{x+2}/D_{x+2}\ldots+P_y/D_y)/(P_x+P_{x+1}+P_{x+2}\ldots+P_y)$, wherein each D is a calculated mining difficulty during a corresponding time period P.

16. The method of claim 15, wherein at least one of the time periods ($P_x$ to $P_y$) is a consecutive block of 24 hours.

17. The method of claim 15, wherein the function provides a heavier weight to higher values of x.

18. The method of claim 1, wherein changing an allocation of the hardware resource mining the first digital asset comprises turning off a hardware component.

19. The method of claim 1, wherein changing an allocation of the hardware resource mining the first digital asset comprises pausing a hardware component.

20. The method of claim 1, wherein changing an allocation of the hardware resource mining the first digital asset comprises resuming a hardware component.

* * * * *